United States Patent

Nakashima et al.

[11] Patent Number: 4,664,409
[45] Date of Patent: May 12, 1987

[54] VEHICLE SHOCK ABSORBER CONTROL SYSTEM

[75] Inventors: Noriyuki Nakashima; Teruyoshi Wakao, both of Nagoya; Kimio Tamura, Anjo; Nobuhiko Makino, Kariya, all of Japan

[73] Assignee: Nippondenso Co., Ltd., Kariya, Japan

[21] Appl. No.: 734,853

[22] Filed: May 16, 1985

[30] Foreign Application Priority Data

May 18, 1984 [JP] Japan ................... 59-101194

[51] Int. Cl.$^4$ ............................................. B60G 17/00
[52] U.S. Cl. ................................................... 280/707
[58] Field of Search ............... 280/707, 703, 702, 688, 280/711, 709; 267/64.15, 64.18, 64.22

[56] References Cited

U.S. PATENT DOCUMENTS 3,603,612  9/1971  Hill ........................................ 280/707
3,995,883  12/1976  Glaze ...................................... 280/707
4,506,909  3/1985  Nakashima et al. ................ 280/707

FOREIGN PATENT DOCUMENTS 30814  2/1983  Japan ................................... 280/707

Primary Examiner—John J. Love
Assistant Examiner—Everett G. Diederiks, Jr.
Attorney, Agent, or Firm—Cushman, Darby & Cushman

[57] ABSTRACT

A shock absorber control system for controlling the damping force of a variable shock absorber comprises a speed sensor for generating a signal indicative of the wheel speed of at least one wheel of the vehicle and a control unit for controlling the damping force. The control unit derives the acceleration from the wheel speed signal and compares the derived acceleration with upper and lower references. The damping force control is effected when the acceleration varies successively so as to assume both values outside the range between the upper and lower references.

8 Claims, 4 Drawing Figures

VEHICLE SHOCK ABSORBER CONTROL SYSTEM

BACKGROUND OF THE INVENTION

The present invention relates to a shock absorber control system for automotive vehicles for optimizing the damping forces of vehicle shock absorbers under varying road surface conditions.

Various types of shock absorber control systems are known. One approach involves inceasing the absorber's damping forces in response to a wheel speed variation which a function of road surface condition. U.S. Pat. No. 4,506,909 filed Dec. 27, 1982 and assigned to the same assignee as the present invention discloses a damping control system which detects rapid wheel speed variations and counts the occurrence of the detected variations. When the count exceeds a prescribed value, the absorber's damping forces are increased. Although satisfactory for road surfaces having continued irregularities, this system fails to respond to surface having irregularities that occur discontinuously.

SUMMARY OF THE INVENTION

It is therefore an object of the present invention to provide a shock absorber control system which eliminate the above-mentioned problems.

It is a further object of the present invention to provide a shock absorber control system arranged so as to adequately control the damping forces of shock absorbers to meet the requirements imposed upon shock absorbers in all running conditions.

With these and other objects which will be become apparent as the description proceeds, a shock absorber control system according to the present invention is employed for at least one shock absorber provided in a vehicle for absorbing the vibration of the body of the vehicle and capable of adjusting its damping force, and comprises at least one wheel speed sensor, means for deriving wheel acceleration from speed values detected by the wheel speed sensor, means for comparing the acceleration with lower and higher reference values, and means for controlling the damping force of the shock absorber in accordance with the results of the comparisons.

According to a feature of the present invention, the damping force of at least one shock absorber is increased when the wheel acceleration varies between a value greater than a preset upper limit and a value lower than a preset lower limit within a predetermined period of time. This is arranged on the basis of the fact that acceleration varies successively toward a higher value and a lower value within a shorter period of time in accordance with abrupt variation of the ground contact area occurred when the vehicle runs on a rough road.

This arrangement makes it possible to adequately control the damping force of the shock absorber under varying road surface conditions.

BRIEF DESCRIPTION OF THE DRAWINGS

The object and features of the present invention will become more readily apparent from the following detailed description of the preferred embodiments taken in conjunction with the accompanying drawings in which.

DESCRIPTION OF THE INVENTION

Figure 1:
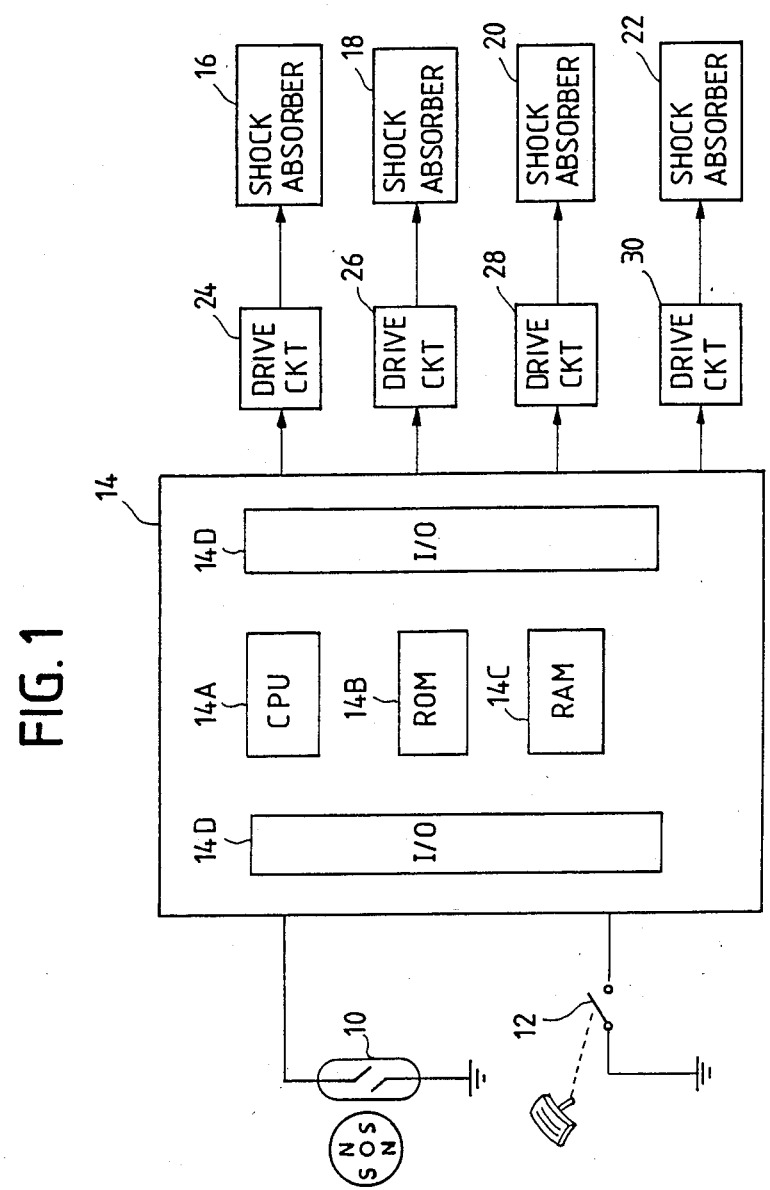
FIG. 1 is a block diagram of a shock absorber control system according to the present invention.

Referring now to the drawings, FIG. 1 shows in block form a shock absorber control system according to the present invention. Illustrated at numeral 14 is a control unit, or a microcomputer having a central processing unit (CPU) 14A, a read only memory (ROM) 14B, a random access memory (RAM) 14C, and an input/output device (I/O) 14D. The operation of microcomputer 14 will be hereinafter described with reference to FIGS. 3 and 4. The microcomputer 14 receives a pulse signal from at least one wheel sensor 10 which is coupled to the wheel or propeller shaft of the vehicle. A series of, for example, 60 pulses are generated for one revolution of a wheel. A brake sensor 12 supplies microcomputer 14 with a brake signal when the footbrake or handbrake is operated. The microcomputer 14 derives wheel acceleration from the wheel speed signal and controls shock absorbers 16, 18, 20, 22 via drive circuits 24, 26, 28, 30.

Figure 2:
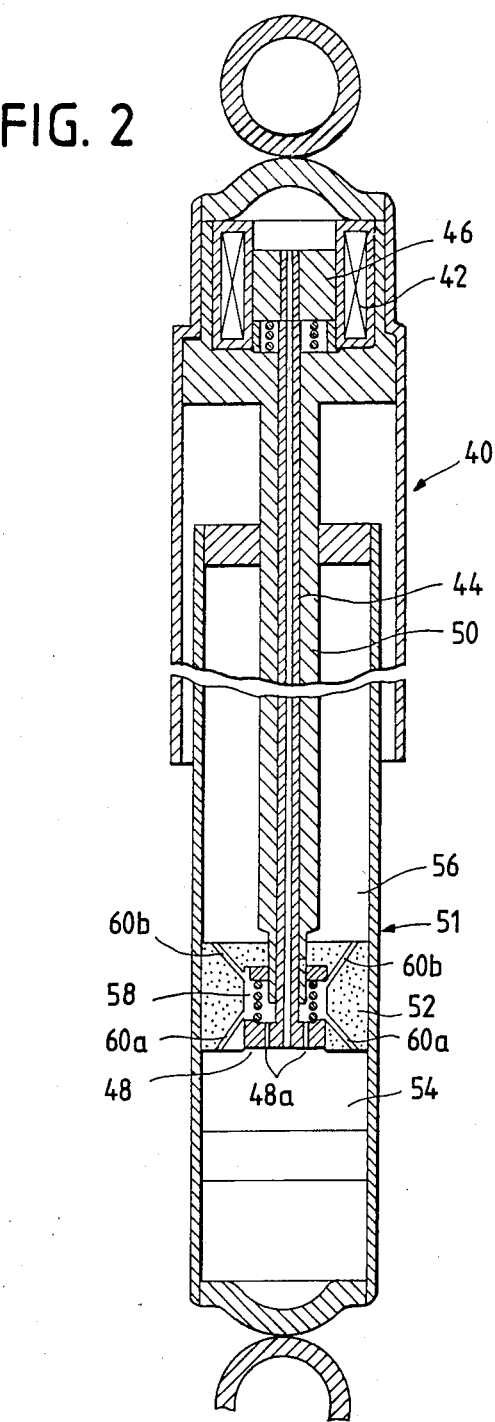
FIG. 2 is a fragmentary longitudinal cross-sectional view of a shock absorber to be controlled by the shock absorber control system according to the present invention.

Before describing the microcomputer 14, it is appropriate to describe the operation of a shock absorber with reference to FIG. 2.

The shock absorber is of a cylindrical type which comprises an upper movable cylinder 40 and a lower cylinder 51. The upper cylinder 40 includes a coil 42 electrically connected to one of the drive circuits 24, 26, 28 and 30, an annular core 46 mounted inside the coil 42, and a connecting rod 44 extending downwardly from the annular core 46 into the lower cylinder 51. The annular core 46 and connecting rod 44 are coaxially arranged to move together to an upward position in response to energization of the coil 42 by a current supplied from an associated drive circuit. The connecting rod 44 is fitted in a piston rod 50 and has on its lower end, and is coupled to, a flow control valve 48 having passageways 48a. The piston rod 50 is coupled to a piston 2 in which the flow control valve 48 is slidable to form a valve chamber 58. The lower cylinder 51 is telescopically coupled with the upper cylinder 40 and includes first and second oil chambers 54 and 56 partitioned by the piston 52.

When the coil 42 is not energized, the flow control valve 48 is in a lower position; oil communicates through passages 60a, 60b and 48a and flows at relatively high rate. In this condition, the shock absorber has a low damping force.

When the coil 42 is energized, the valve 48 is moved upward and closes passages 60b to cause oil to flow at lower rate through passages 60a and 48a. The shock absorber has, in this condition, a higher damping force.

Figure 3:
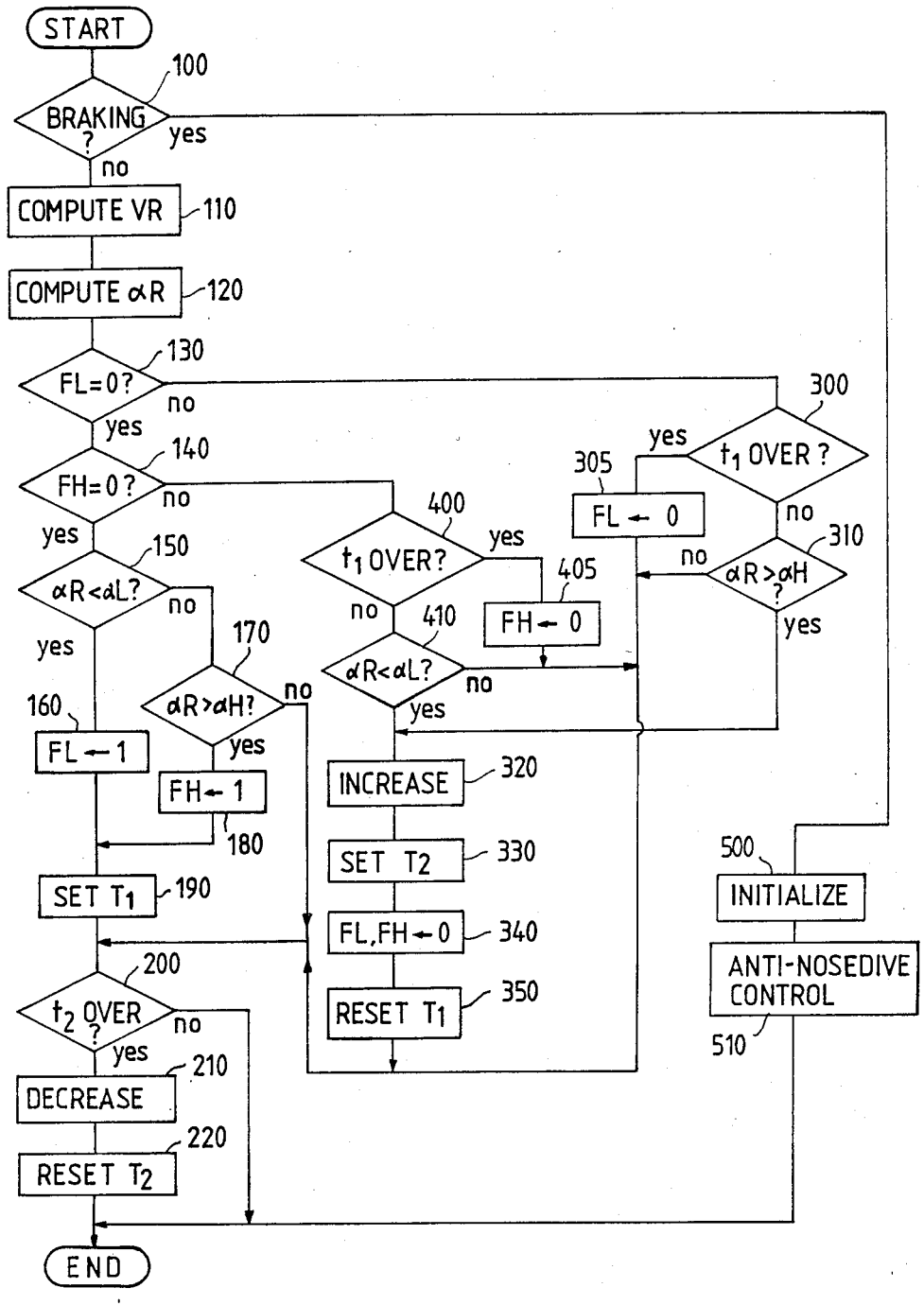
FIG. 3 is a flowchart illustrative of steps of operation of the shock absorber control system according to this invention for controlling the damping force of the shock absorber.

FIG. 3 is a flow chart describing the functions performed by the microcomputer 14.

In a step 100, the CPU checks the output of brake sensor 12 to see if the vehicle is in a braked condition. If so, control goes to an initialization step 500 to reset timers T1 and T2 and flages FL and FH to "0". Step 510 follows to perform anti-nosedive control which will be described later. Otherwise, control exits to step 110 to derive wheel speed VR from the output signal of wheel speed sensor 10. In the next step 120, an acceleration value αR is computed on the basis of the wheel speed value obtained in the step 110.

Steps 130 and 140 are then executed to check flags FL and FH which are both reset to "0" at the beginning of this routine. Control advances to a step 150, to compare the acceleration value αR obtained in the step 120 with a lower limit value αL stored in ROM 14B. If αR < αL, control goes to step 160 and flag FL is set to "1". If αR > αL, the acceleration value αR is compared in step 170 with an upper limit αH stored in ROM 14B. If αR > αH, flag FH is set to "1", in step 180.

Therefore, when αL < αR < αH, the microprocessor advances to a step 200. If the acceleration value αR is out of the range between αL and αH, i.e, either of flags FL and FH is set to "1", a subsequent step 190 is executed to set a first timer T1 of the microprocesser to count clock pulses.

The step 200 is provided for checking the conclusion of counting performed by a second timer T2 which will be hereinlater described. Since timer T2 has been reset, control exits through "NO" decision path and terminates the routine.

This routine is repeatedly executed at periodic intervals.

When the output signal of the brake sensor 12 is still absent in the next execution of the routine, the steps 110 and 120 are executed to derive acceleration αR, followed by execution of step 130.

IF wheel acceleration has been reduced below the lower limit and hence flag FL has been set to "1" in the step 160 of the previous execution, control exits to step 300 and, if not, it goes to the step 140.

Step 300 checks whether the timer T1, which was set in the previous execution, has reached a preset count value t1. If so, flag FL is set to "0" in a step 305 and control passes through step 200 to the end of the routine. If T1 is not reached, control exits to step 310 to compare the acceleration value αR with an upper limit αH. This comparison is to determine whether the wheel acceleration has increased from a level below αL to a level higher than αH within the period set by t1. If so, control exits to step 320 to energize coils 42 to increase the damping forces of the shock absorbers. Otherwise, the routine is terminated through step 200.

Step 320 is followed by step 330 in which the second timer T2 is set to start counting clock pulses. The flags FL and FH are then set to logic "0" in the following step 340 and the timer T1 is reset in a step 350 which is followed by step 200 to check whether the timer T2 set in the step 330 has reached a preset count value t2. If so, step 210 is executed to decrease the damping forces of the shock absorbers by de-energizing the coils 42. After the execution of step 210, step 220 follows to reset the timer T2.

If wheel acceleration exceeded the upper limit and hence flag FH has been set to "1" in the previous execution, control reaches step 400 in the next execution to check if count t1 has been reached in the timer T1. If so, flag FH is reset in step 405 and control goes to the step 200, and if not, a comparison step 410 is executed to check whether the acceleration value αR is below the lower limit. If wheel acceleration has decreased from a higher-than-αH level to a lower-than-αL level within the period of t1, step 320 is executed to increase the damping forces.

It is seen therefore that if either flag is set to "1" in the previous routine, timer T1 is started in the next routine to detect when wheel speed has changed rapidly in either direction in order to increase the damping forces of the shock absorbers. The high damping condition is maintained for period t2.

The increased damping forces of the shock absorbers are maintained until the timer T2 counts up t2.

If the output of brake sensor 12 is detected in step 100, control goes to initialization step 500 and hence to anti-nosedive control step 510. The damping forces of the shock absorbers are particularly controlled to prevent a nosedive from occuring in reponse to the operation of the brake.

It is desirable that the upper and lower limits are updated in accordance with vehicle speed to optimize the damping forces at all vehicle speeds.

Figure 4:
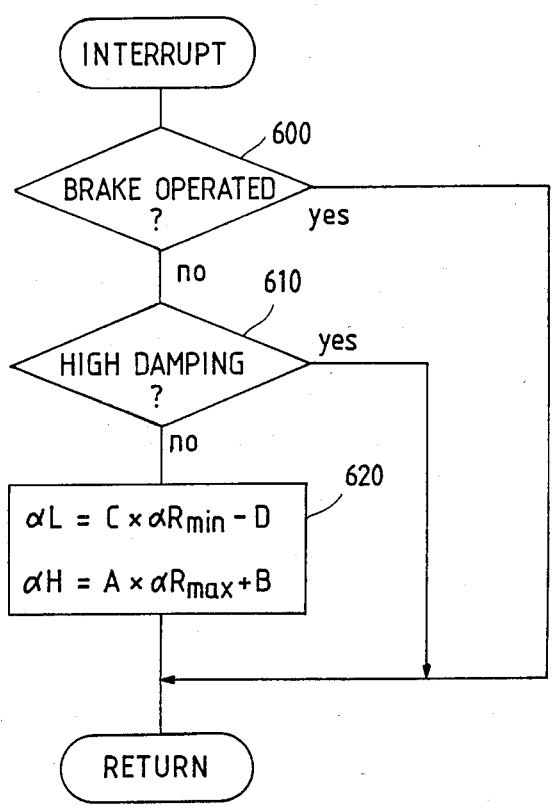
FIG. 4 is a flowchart of an interrupt program for updating upper and lower limit values for optimizing damping force control.

For this purpose an interrupt routine is provided to update the limit values at intervals of 100 ms. In FIG. 4, the interrupt routine commences with step 600 wherein brake sensor output is addressed. If the brake is applied, steps 610 and 620 are skipped. With the vehicle running, control exits to step 610 to check if the timer is in a set condition in order to detect when the damping forces are maintained at a higher value. If so, control returns to the main routine; if not, it proceeds to step 620 to update the upper and lower limits as follows:

$$\alpha H = A \times \alpha Rmax + B$$

$$\alpha L = C \times \alpha Rmin - D$$

wherein αRmax and αRmin represent maximum and minimum values of acceleration, respectively, obtained in the step 120, and A, B, C and D are constants.

The upper and lower limits αL and αH are respectively limited to within a predetermined range to prevent them from assuming excessively large values.

Since the shock absorber control system according to the present invention is arranged so as to update the upper and lower limits at every 100 ms, the damping forces of the shock absorber can be adequately controlled to prevent overdamping.

It should be understood that the foregoing relat.es to only a preferred embodiment of the invention, and that it is intended to cover all changes and modifications of the example of the invention herein chosen for the purposes of the disclosure, which do not constitute departures from the spirit and scope of the invention.

What is claimed:

1. A shock absorber control system for controlling the damping force of at least one variable shock absorber mounted in a vehicle, comprising:
   speed sensor means for generating signals indicative of the wheel speed of at least one wheel of said vehicle;
   acceleration deriving means for deriving a wheel acceleration on the basis of the generated wheel speed signal;
   first determination means for producing a signal when the derived wheel acceleration goes out of a predetermined range by reaching any one of an upper or lower limit, the upper and lower limits defining boundaries of the predetermined range;
   second determination means for producing a signal when the derived wheel acceleraton subsequently goes out of said predetermined range by reaching the other one of said upper or lower limit, within a first predetermined period of time from the production of the signal said first determination means; and control means for adjusting the damping force of said shock absorber in accordance with said signal produced by said second determination means.

2. A shock absorber control system as claimed in claim 1, further comprising means for maintaining an increase of the damping force for a second predetermined period of time and returning to the damping force of said shock absorber to a normal level after the elapse of said second predeterined peroid of time.

3. A shock absorber control system as claimed in claim 1, further comprising:
  brake sensor means for generating a brake signal in response to the operation of a braking device of said vehicle; and
  removing means for removing the control of increasing the damping force by said control means.

4. A shock absorber control system as claimed in claim 1, further comprising changing means for periodically changing at least one of said upper and lower limits on the basis of a maximum or minimum value of the wheel acceleration previously derived.

5. A shock absorber control system as claimed in claim 4, wherein said changing means periodically changes said upper limit on the basis of the maximum value of the wheel acceleration previously derived and changes said lower imit on the basis of the minimum value of the wheel acceleration previously derived.

6. A shock absorber control system for controlling the damping force of at least one variable shock absorber incorporated in a vehicle, comprising:
  speed sensor means for generating signals indicative of the wheel speed of at least one wheel of said vehicle; and
  data processing means programmed for performing the following fuctions:
  (a) deriving a wheel acceleration on the basis of the generated wheel speed signals;
  (b) producing a first signal when the derived wheel acceleration goes out of a predetermined range by reaching any one of an upper or lower limit, the upper and lower limits defining boundaries of the predetermined range;
  (c) setting a first timer in response to the first signal;
  (d) producing a second signal when the derived wheel acceleration subsequently goes out of said predetermined range by reaching the other one of said upper or lower limit, within a period of time set in said first timer; and
  (e) adjusting the damping force of said shock absorber for a predetermined period of time in response to said second signal.

7. A shock absorber control system as claimed in claim 6, said data processing means being programmed for further preforming the function of setting said predetermined period of time in a second timer in response to the second signal.

8. A shock absorber control system for controlling the damping force of at least one variable shock absorber mounted in a vehicle, comprising:
  speed sensor means for generating a signal indicative of the wheel speed of at least one of said vehicle;
  acceleration deriving means for deriving a wheel acceleration on the basis of the generatied wheel speed signal;
  determination means for producing a signal when a period of time required for the derived wheel acceleration to reach a lower limit of a predetermined range after an instant at which it has reached an upper limit thereof or a period of time required for the derived wheel acceleration to reach said upper limit after an instant at which it has reached said lower limit is shorter than a predtermined period of time; and
  control means for adjusting the damping force of said shock absorber for a predetermined period of time in response to the determination by said signal produced means.

* * * * *